Nov. 5, 1957   H. J. STEPHAN ET AL   2,812,037
RECOVERY OF MALEIC ANHYDRIDE
Filed Jan. 4, 1956
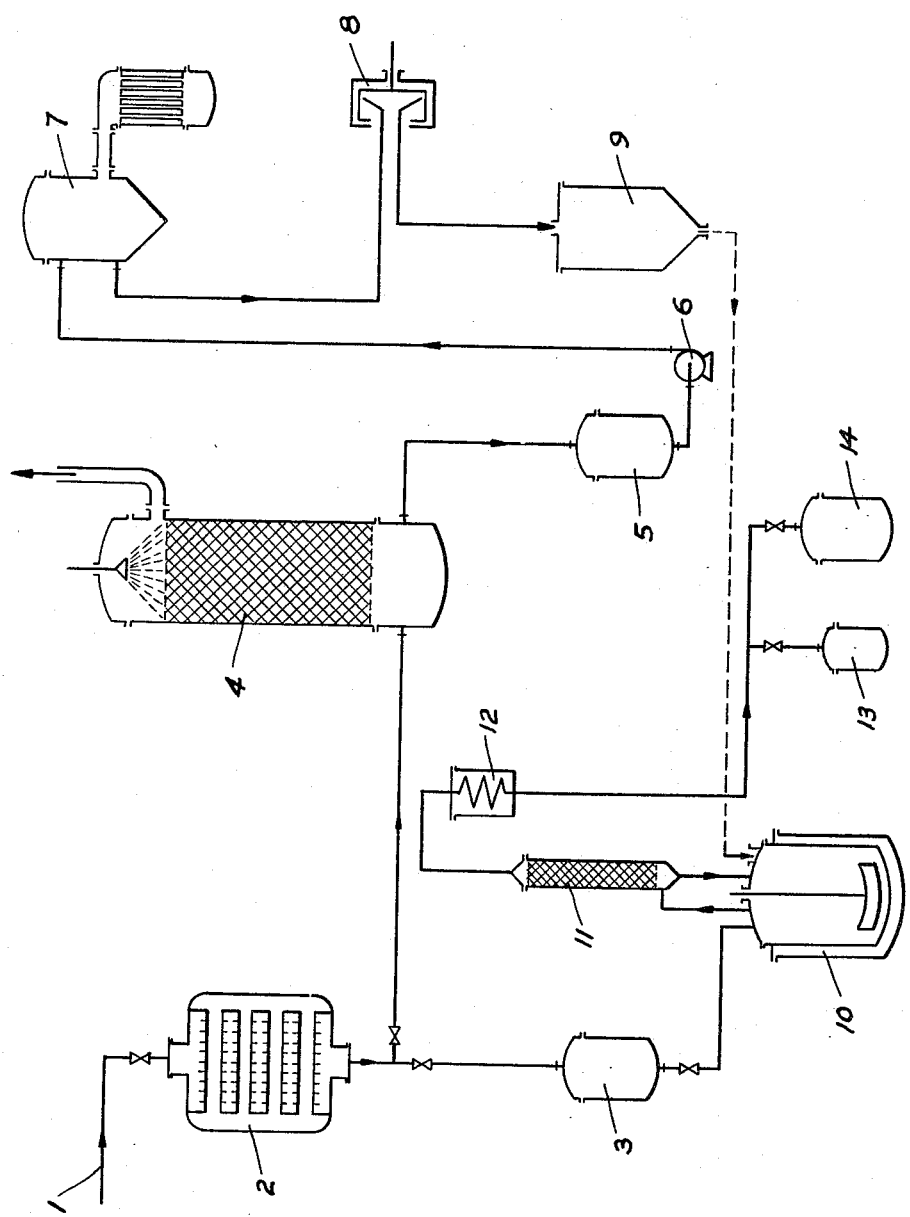
INVENTORS
HANS JOACHIM STEPHAN
WERNER KOEHLER
BY
ATTORNEYS

United States Patent Office 2,812,037
Patented Nov. 5, 1957

2,812,037

RECOVERY OF MALEIC ANHYDRIDE

Hans Joachim Stephan and Werner Koehler, Ludwigshafen (am Rhine), Germany, assignors to Badische Anilin- & Soda-Fabrik Aktiengesellschaft, Ludwigshafen (am Rhine), Germany Application January 4, 1956, Serial No. 557,246

Claims priority, application Germany January 12, 1955

5 Claims. (Cl. 183—120)

This invention relates to a new and improved process in recovering maleic anhydride from gases containing the same.

The separation of maleic anhydride from hot gas mixtures, such as are obtained for example in the oxidation of benzene in the vapor phase, has hitherto been carried out by preparing from the gas mixture, an aqueous maleic acid solution and recovering the maleic anhydride therefrom by evaporation and subsequent dehydration. The process has the drawback that considerable amounts of undesirable by-products, in particular fumaric acid, are formed.

We have now found that the disadvantages of the known methods are avoided and maleic anhydride is recovered in good yields from gases containing the same by separating considerable amounts of anhydride from the gases by cooling to a temperature below the dewpoint of the anhydride but above the temperature at which the condensation of water takes place, freeing the gases from residual anhydride by washing with water and distilling the solid maleic acid, recovered from the aqueous solution, together with the anhydride isolated by condensation.

Suitable gases containing maleic anhydride are for example the hot waste gases which are obtained in the vapor phase oxidation of benzene, crotonaldehyde, di- or tetrahydrofurane or aliphatic hydrocarbons with 4 or more than 4 carbon atoms in the molecule with oxidizing gases, as for example air. The hot oxidation gases which leave the oxidation zone at a temperature of about 300° to 400° C. contain from 14–20 grams of maleic anhydride and from 10–30 grams of water to each cubic meter of gas (NTP). In addition, it contains nitrogen, carbon dioxide and carbon monoxide.

In order to carry out the process, the gases are cooled to a temperature which lies below the dewpoint of the maleic anhydride so that the anhydride is stripped to an appreciable extent i. e. to at least about 50 percent, preferably 80 to 92 percent, (by weight) of the total quantity contained in the gases. It is necessary that the temperature lies above the temperature at which the condensation of the water vapor present in the gas takes place. The temperature suitable for cooling the gas, at which besides the anhydride no water is separated, lies between about 70° and 20° C., in particular between about 50° and 25° C. It may readily be ascertained by preliminary experimentation or preferably determined by ascertaining the water content per cubic meter of initial gas in the usual way and reading off from a vapor pressure table the temperature which exhibits a vapor pressure corresponding to the water content.

In the separation the procedure may be for example that the gas containing maleic anhydride is set in vigorous eddying or turbulent motion during or after the cooling. The turbulence can be achieved for example by introducing the gas with sufficient speed tangentially into a cylindrical vessel so that the gas turbulence is caused by impact and spinning action. The turbulence can also be produced by arranging spinning, rebound or deflecting plates besides cooling elements, as for example cooling spirals, cooling chambers or finned tubes, in the path of the gas or wholly or partly filling the path of the gas with shaped articles, such as rings or spirals. Furthermore the turbulence can be effected by inserting in the path of the gas moving members, as for example bucket wheels or gyroscopes.

From the gases which have been cooled and from which the bulk of the content of maleic anhydride has been removed, the residual portion of the anhydride is washed out by treatment with water. This can be effected in the usual way, for example by leading the gas into water, by washing in trickling towers or by spraying water into vessels through which the gas is being led. The quantity of water used is such that the gases leaving the washing vessel are free from maleic anhydride, the quantity of water required being from 0.05 to 0.1 liter for each cubic meter of gas. Desirably, the gases are washed at temperatures ranging between 30° and 80° C., more especially between 30° and 45° C.

The acid recovered from the washing water is combined with the anhydride which has been isolated by condensation. The mixture is distilled in a conventional manner at atmospheric or reduced pressure, for example between 200 and 20 Torr. (the term "Torr." is the international unit of pressure signifying one millimeter of mercury), more especially 120 to 50 Torr., whereby the greater part of the acid is converted into anhydride at the beginning of the distillation and the dehydration water distils over as first runnings, the residue passing over practically completely as maleic anhydride. The hot gases are cooled down to at least 55° to 60° C., the anhydride separating in a pure solid crystalline form.

As compared with the known methods, the process according to the present invention has the advantage that the maleic anhydride is obtained from the gases practically completely and in very pure form, and side reactions, in particular the formation of fumaric acid, are avoided.

Our invention will be better understood from the following description to be taken in connection with the accompanying drawing:

The gas containing 14 to 20 grams per cubic meter of maleic anhydride and 13 to 25 grams per cubic meter of water vapor arrives from 1 at a temperature of 90° C. and is cooled down to 30°–40° C. in the cooler 2. The cooler herein shown is a tubular cooler in which the gases travel about the tubes. To add to the turbulence of the flowing gases the tubes are fitted with upright sheet iron discs or spirals. Through the tubes a coolant is passed. The temperature of which is so controlled that the water which the gas contains in a vaporous state is not condensed. After two hours the feed is discontinued and the cooler 2 is cleared of maleic anhydride by melting it and letting it flow into the container 3. From the cooler 2 the gas flows to the washing tower 4, where it is stripped of any anhydride left by scrubbing it with water. The washing liquor is collected in the container 5, passed to the vaporizer 7 by the pump 6 and concentrated therein, solid maleic acid being precipitated. In the centrifuge 8, the maleic acid is stripped of the mother liquor and then collected in the container 9. The mother liquor is recirculated and reused in the process.

In the stirrer-fitted distilling vessel 10 a mixture of crude maleic anhydride from container 3 and solid maleic acid from 9 is distilled at reduced pressure. The vapors formed pass through column 11 and are condensed in the cooler 12. The aqueous forerun is caught in the container 13, while the pure maleic anhydride is caught in the container 14.

The following examples will further illustrate this invention but the invention is not limited to these examples,

Example 1

5,400 cubic meters of a gas obtained by the oxidation of benzene with air in the presence of a vanadium pentoxide catalyst and containing 17 grams of maleic anhydride and 23 grams of water per cubic meter are fed into a tubular cooler at a temperature of 90° C. and cooled down therein to 35° to 40° C., 46 kilograms of 98 percent maleic anhydride being separated as a brown crude product. From the residual gas, 54 kilograms of 98 percent maleic acid are recovered by washing the gas with from 0.05 to 0.1 liter of water per each cubic meter of gas at a temperature of 30° C. and evaporating the solution. The two products are united and the resultant mixture distilled in vacuo at 75 Torr. and at 124° to 126° C. from a still with stirring means and a short column. By condensing the vapor at 55° to 60° C., there are obtained, besides a first running which consists of 0.5 kilogram of aqueous about 40 percent maleic acid, 84.6 kilograms of 98.4 percent maleic anhydride. As a residue, there remains in the still 2.0 kilograms of a tarry mass. The yield of maleic anhydride thus amounts to 92.6 percent of the theoretical yield.

Example 2

5,700 cubic meters of a gas of the type specified in Example 1 are fed by portions into a cooling system which consists of a tubular cooler 2 meters in length with tubes 40 millimeters in internal width in which spirals of sheet iron are accommodated. The total cooling surface is 30 square meters over which 900 cubic meters of gas are passed per hour. The feed of gas is discontinued after every two hours, the anhydride stripped in the cooler is re-melted and discharged and then the feed of gas is re-started. The gas which is fed in at a temperature of 90° C. is cooled down to from 30° to 35° C. on passing through the system, a total of 77.2 kilograms of 98 percent maleic anhydride being separated. The residual gas is washed with water at a rate of 0.05 to 0.1 liter per cubic meter of gas at 30° C. in a trickling tower so that the gases leaving the tower no longer containin anhydride, the resultant solution being concentrated by evaporation. By centrifuging there are obtained 22.8 kilograms of 98 percent maleic acid. The mother liquor is used again to avoid waste. The maleic acid is united with the crude maleic anhydride and the resultant mixture, which contains 94.6 kilograms of 100 percent maleic anhydride, is distilled under reduced pressure from a still having stirring means, with the interposition of a short column. By maintaining a pressure of 110 Torr. and a temperature of 113° to 135° and condensing the vapor at 55° to 60° C., a forerun consisting of 1.85 kilograms of an aqueous 49 percent maleic acid solution and 917 kilograms of 99 percent maleic anhydride is obtained. In the still there remain as a residue 1.8 kilograms of a tarry mass which becomes granular on cooling and contains 83 percent of maleic anhydride.

If the distillation is carried out at higher pressures and temperatures in an analogous manner, the amount of residue is increased somewhat, but even at normal pressure good yields are possible.

What we claim is:

1. In the process for the recovery of maleic anhydride from hot gases containing the same and water vapor, the steps which comprise separating considerable amounts of the anhydride from the gas by cooling to a temperature below the dewpoint of the anhydride but above the temperature at which the condensation of the water takes place, stripping the gas of the remainder of the anhydride by washing with water, evaporating the water and subjecting the solid maleic acid isolated from the aqueous solution formed in the aforesaid washing step to distillation, together with the anhydride obtained by condensation.

2. The process as claimed in claim 1, wherein the cooling of the hot initial gases is carried out to a temperature within the range of from 70° to 20° C., at which no condensation of the water occurs.

3. The process as claimed in claim 1, wherein the cooled gases are brought into a turbulent motion while being cooled.

4. The process as claimed in claim 1, wherein the cooled gases are brought into a turbulent motion after having been cooled.

5. In the process for the recovery of maleic anhydride from hot gases containing from 14 to 20 grams maleic anhydride, and from 10 to 30 grams of water vapor, per each cubic meter of gas (NTP), the steps which comprise separating from 50 to 92 percent by weight of the quantity of anhydride contained in the initial gas by cooling the gas to a temperature below the dewpoint of the anhydride but above the temperature at which the condensation of water occurs, stripping the gas of the remainder of the anhydride by washing with water, evaporating the water and subjecting the solid maleic acid isolated from the aqueous solution formed in the aforesaid washing step to distillation, together with the anhydride obtained by condensation.

References Cited in the file of this patent

UNITED STATES PATENTS 2,076,033     Kniskern _____ Apr. 6, 1937